May 16, 1933.   B. NAGLER ET AL   1,909,845
HELICOPTER AIRCRAFT
Filed Dec. 16, 1931   2 Sheets-Sheet 1
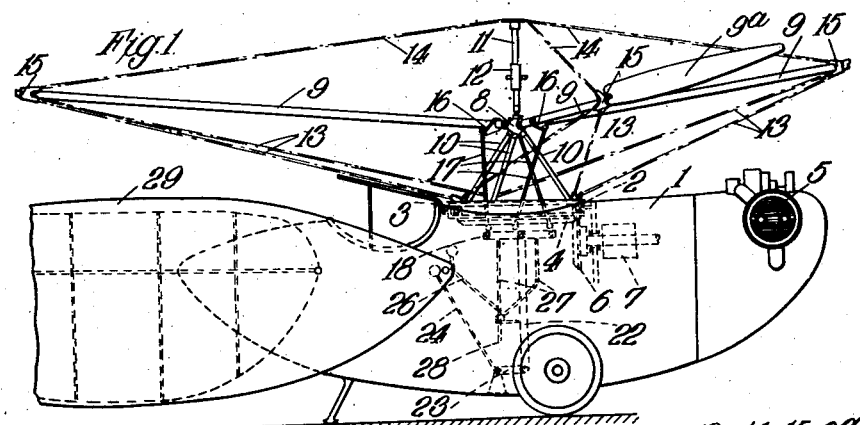
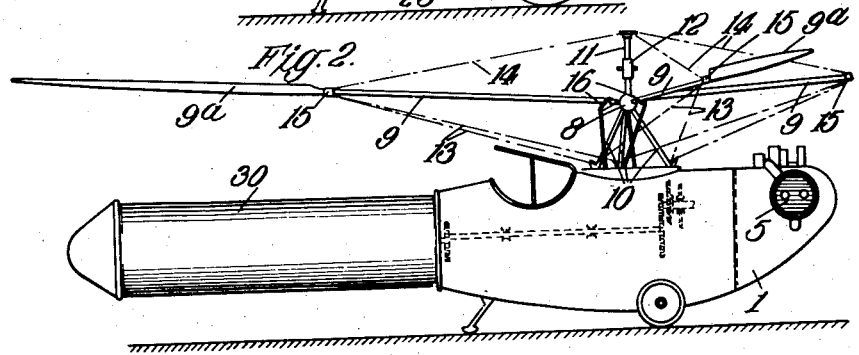
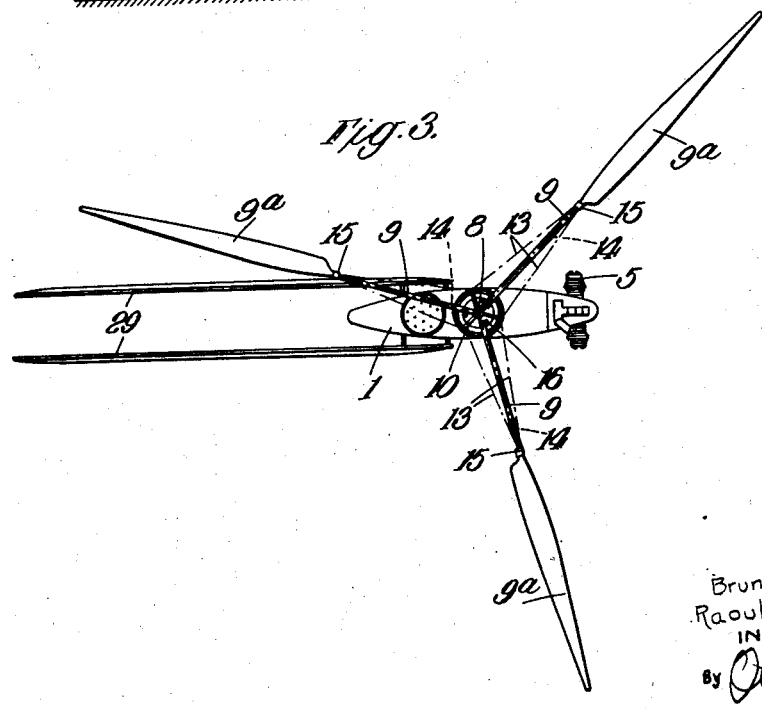
Bruno Nagler
Raoul Hafner
INVENTORS

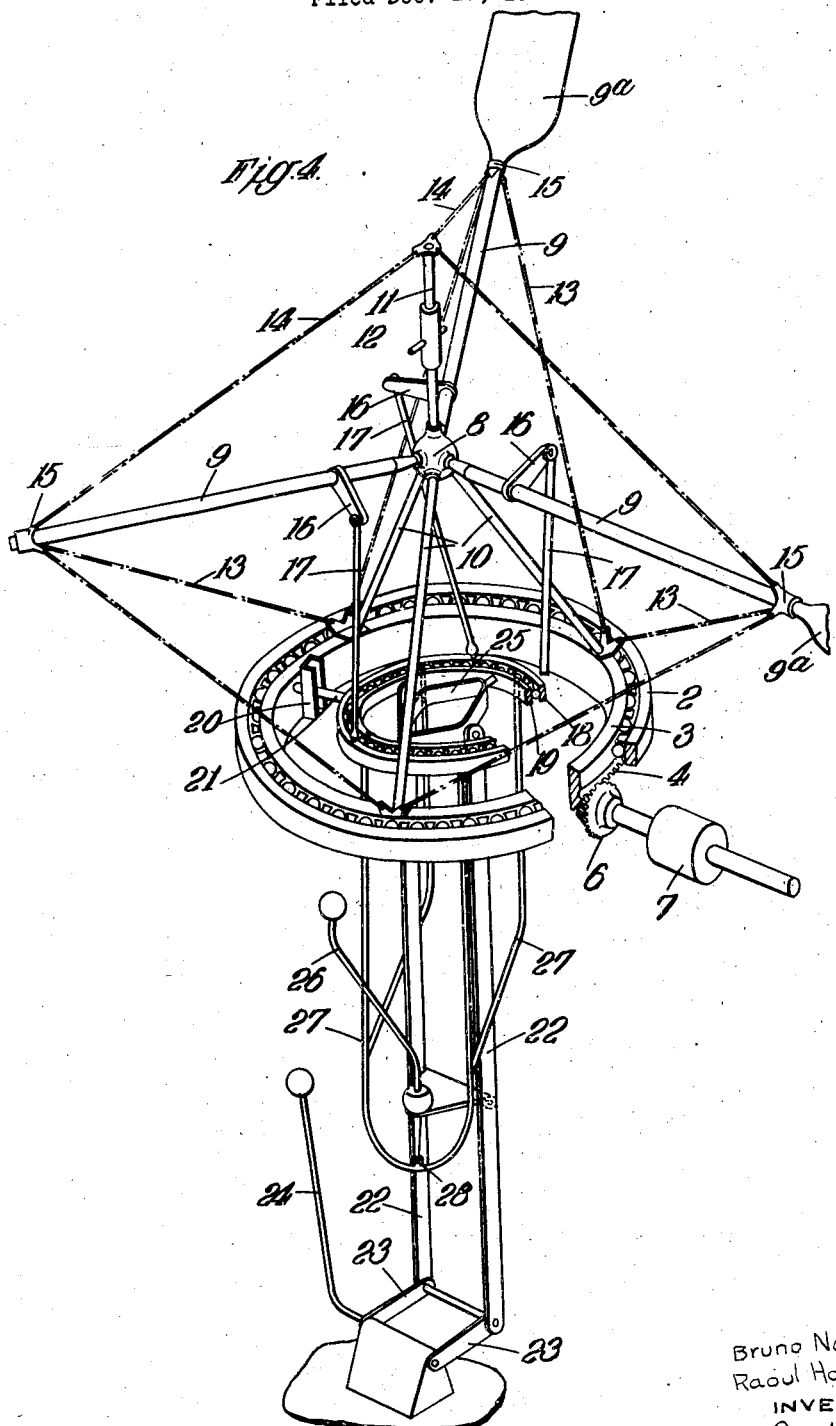

Patented May 16, 1933

1,909,845

UNITED STATES PATENT OFFICE

BRUNO NAGLER AND RAOUL HAFNER, OF VIENNA, AUSTRIA

HELICOPTER AIRCRAFT

Application filed December 16, 1931, Serial No. 581,331, and in Austria December 16, 1930.

This invention relates to a helicopter aircraft in which the individual blades of the lifting screw are rotatable about their individual axes, and as a whole, as well as during their rotation, can be given varying angles of incidence or setting so that the lifting action can be varied as a whole as well as made different at different points of the circle of revolution, the points in the said circle of greatest or smallest angle of incidence being variable at will.

The present invention relates to the mechanical and constructive features of such an aircraft.

The construction of the screw shaft offers substantial difficulties as in addition to the great torque, it has to take up also very high bending moments.

The invention eliminates these difficulties by providing a bearing of a large diameter, one of the ball race rings of which is rigidly secured to the aircraft frame whilst the other ball race, driven from the engine, is used as the base for gracing the lifting-screw boss or hub, and for bracing the blade arms.

Preferably, the bracing of the lifting screw hub or boss is effected by means of conically converging struts mounted on the engine driven ball race ring or by means of a complete cone surface.

In order to ensure uniform bracing of all the blade arms, the said bracing is effected by means of a strut of adjustable length mounted on the blade hub or boss in its axial direction, to the free end of which are secured the bracing wires leading to the blade arms.

This method of bracing makes possible a construction in which the arms of the lifting screw blades are mounted with inner end pins in bearing sockets in the lifting screw boss, so that to dismantle the lifting-screw, it is merely necessary to loosen the strainer wires by shortening the bracing strut to such an extent as to enable the inner end pins of the blade arms to be pulled out of the bearing sockets.

In order to make the bracing independent of the rotary setting of the blades about their individual axes, the bracing wires leading from the engine driven ball bearing ring as well as those from the above mentioned bracing strut end, to the blade arms, may be made to engage with sleeves freely rotatable on the blade arms but prevented from moving axially thereon.

A substantial difference from the well known constructions will be found also in the mechanical arangement or device for the variation of the angle of setting of the lifting screw blades, which comprises a ring shaped ball bearing, co-axial with the lifting screw and capable of both bodily adjustment in the axial direction, and of tilting adjustment relatively to the said axis. One ball race ring engages with the adjusting control members, and the other ball race ring engages with the members which effect the angular adjustment of the blades.

It is thus possible to mount both members with their respective ball race by simple pivot points and at these points any constantly sliding or rolling members are avoided, as the relative movement of rotation between the adjusting control members and the blade adjusting members takes place through the relative turning of the two ball bearing rings.

For modifying the inclination of the plane of rotation of the said ball bearing relatively to the lifting screw axis, there is provided according to the invention a control lever or handle which can be moved bodily with the ball bearing in the direction of the lifting screw axis, and turned in every direction, and one end of which engages with a member projecting from the non-rotating ball bearing race in the geometrical axis of the ball bearing or close to the same.

The features of the invention above referred to will be more clearly understood from the following description of the accompanying drawings.

In these drawings,

Figure 1 is a side view of a scheme of construction of helicopter aircraft according to the invention, with certain portions broken away to reduce the size of the drawings.

Figure 2 is a side elevation on a reduced scale, with modified means for preventing rotation of the body of the aircraft during flight.

Figure 3 is a plan on a further reduced scale of a complete aircraft according to Figure 1.

Figure 4 shows a perspective view of the essential parts of the aircraft according to the present invention.

In the aircraft body 1 is mounted in a fixed manner the large diameter ball bearing race or ring 2. The second ball race or ring 3 rotatable in the same, has bevel wheel teeth 4 with which meshes the bevel pinion 6 driven by the motor or engine 5. Into the transmission shaft is inserted a free-wheel coupling 7 which, on the engine being stopped, ensures free rotatability of the lifting screw.

The inner ball race ring 3, which owing to its large diameter is very suitable for taking up great turning or lifting forces, is used as the base for the bracing and supporting of the lifting-screw boss 8, situated in the geometrical axis of the ring, and of the blade arms 9. This boss 8 is braced against the ring 3 by means of struts 10. In place of the struts 10, a solid cone surface of sheet metal of the like might be used, fixed to the ring 3 with its apex supporting the boss 8. The boss 8 has approximately radially arranged bearing sockets in which are mounted the inner bearing pins of the blade arms 9. On the boss 8 is mounted in its geometrical axis of rotation, a bracing strut 11 which can be lengthened or shortened by means of opposite screw-threads by means of the turnbuckle 12.

The bracing of the blades is effected by means of strainer wires 13 attached to the ring 3, and of strainer wires 14 attached to the upper end of the strut 11. All the strainer wires are carried to sleeves 15 which are mounted on the blade arms 9 and in which the blade arms can rotate, but the sleeves are prevented from longitudinally moving on the blade arms. Owing to this arrangement, all the bracing members can be regulated together merely by lengthening or shortening the strut 11. By suitably shortening the strut 11, it can be withdrawn from its seat on the boss 8, thus slackening the bracing wires 13 and 14, so that the blade arms 9 can be withdrawn from their bearing sockets in the boss 8. Instead of mounting the sleeve 15 in a rotatable manner on its blade arm, it might be rigidly secured to it, as the strainer wires, as they engage practically with only one common point of the blade arm, can yield sufficiently to the slight variation of length when the blades are turned.

The blade arms 9 carry cranks 16 which are linked by means of rods 17 to the outer ball race ring 18 of a ball bearing which is arranged centrally in relation to the ball bearing 2, 3 and the inner ball race ring 19 of which is supported in such a manner that it is vertically adjustable and can be inclined in every direction. To ensure that the ball race ring 18 shall participate in the rotation of the ball race ring 3, the latter is provided with guides 20 with which pins 21 of the ring 18 engage. The ring 19 and therefore the whole ball bearing, may be moved parallel to the general axis through the boss 8 by the supports 22 by means of the control lever arrangement 23, 24. On the supports 22 is articulated the Cardan or universal joint frame 25 on which the ring 19 is trunnioned.

Other forms of universal joint might be substituted for that shown, such as some convenient arrangement of a ball and socket joint.

The tilting of the ring 19 is effected by means of the control lever 26 which is mounted on the supports 22 so as to be vertically adjustable therewith, and the free end of the said lever 26 engages with a socket 28 of the stirrup 27 the upper ends of which are connected to the ring 19. The socket 28 is arranged exactly or approximately in the geometrical axis of the ball bearing 18, 19. The raising and lowering of the ball bearing 18, 19 by means of the control lever 24 produces a simultaneous variation of the angle of setting of all the lifting screw blades, whilst the inclination of the bearing by means of the control handle or lever 26 produces variation of the angle of incidence of the blades during their rotation.

The free wheel coupling 7 is intended to enable the lifting screw to rotate freely in the event of the engine being stopped. During the gliding of the aircraft, the lifting screw will be driven by the air current rising relatively to it. The energy stored in the lifting screw can then be utilized for taking up the shock of landing by moving the blades into a position producing a lift.

The control surfaces or planes 29 mounted on the body, which are substantially vertical and can be inclined from that position to either side, are struck by the downward air current from the lifting screw, and produce a torque counteracting the torque of the lifting screw, which counter-torque prevents the body from turning during the flight.

In order to take up the torque of the lifting screw, it is known to arrange on the aircraft body upright tail planes 29 (Figure 3) which can be set at different angles to the vertical, and are struck by the air current from the lifting screw, and in deflecting it, are subject to a counter torque which prevents the aircraft body from rotating.

The invention utilizes for the same purpose the "Magnus" effect, for which there is provided a substantially horizontal rotor 30 (Figure 2) driven from the engine, and preferably with a speed substantially proportional to that of the lifting screw. This has the advantage that with the increase of the speed of rotation of the lifting screw, and of the torque increasing with it, the "Magnus" effect or the counter torque will also automatically increase.

We claim:

1. A helicopter aircraft comprising a lifting screw with blades and blade arms and a hub for supporting the inner ends of the said arms, a ball bearing of large diameter, one ball race ring of which is fixed to the aircraft frame while the other ring is rotatable and forms the base for supporting and bracing the lifting screw hub by a pyramidally converging structure attached on the one hand to the said rotatable bearing ring and on the other hand to the lifting screw hub.

2. Aircraft according to claim 1, wherein the said converging structure consists of pyramidally converging struts.

3. Aircraft according to claim 1, wherein the said converging structure consists of a closed hollow pyramidal structure with its base fixed to the said rotating ring and its apex fixed to and supporting the lifting screw hub.

4. Aircraft according to claim 1, wherein the said converging structure consists of a closed hollow conical structure with its base fixed to the said rotating ring and its apex fixed to and supporting the lifting screw hub.

5. Aircraft according to claim 1, comprising a bracing strut of adjustable length mounted above the lifting screw hub in its geometrical axis of rotation, and bracing wires between the upper end of the said strut and the blade arms and between the blade arms and the said rotatable ball race ring.

6. Aircraft according to claim 1, comprising a bracing strut of adjustable length mounted above the lifting screw hub in its geometrical axis of rotation, and bracing wires between the upper end of the said strut and the blade arms and between the blade arms and the said rotatable ball race ring, and wherein the inner ends of the arms of the lifting screw blades are mounted by withdrawable bearing pins in bearing sockets in the lifting screw hub, whereby the lifting screw can be dismounted by shortening the adjustable strut to loosen the bracing wires sufficiently to enable the bearing pins of the blade arms to be withdrawn from the bearing sockets.

7. Aircraft according to claim 1, comprising a bracing strut of adjustable length mounted above the lifting screw hub in its geometrical axis of rotation, bracing wires between the upper end of the said strut and the blade arms and between the blade arms and the said rotatable ball race ring, and sleeves mounted upon the blade arms by means preventing them from longitudinal movement thereon, the said bracing wires being connected to the said sleeves.

8. Aircraft according to claim 1, comprising a bracing strut of adjustable length mounted above the lifting screw hub in its geometrical axis of rotation, bracing wires between the upper end of the said strut and the blade arms and between the blade arms and the said rotatable ball race ring, and sleeves mounted upon the blade arms by means preventing the said sleeves from longitudinal movement on the said arms while permitting the said arms to rotate in the said sleeves, the said bracing wires being connected to the said sleeves.

9. Aircraft according to claim 1, having means for producing variation of the angle of incidence of the lifting screw blades, the said means comprising a second ball bearing one race of which is connected with the rotatable ring of the first mentioned bearing by means causing it to rotate therewith, and also connected with the blade arms by means causing variation of the inclination of the blades by up or down movement of the said second bearing, and means connected with the other ring of the said second ball bearing to effect up and down adjustment of the said bearing.

10. Aircraft according to claim 1, having means for producing variation of the angle of incidence of the lifting screw blades, the said means comprising a second ball bearing one race of which is connected with the rotatable ring of the first mentioned bearing by means causing it to rotate therewith, and also connected with the blade arms by means causing variation of the inclination of the blades by up or down movement of the said second bearing, means connected with the other ring of the said second ball bearing to effect up and down adjustment of the said bearing, and means also connected with the said other ring of said second bearing for varying its inclination to effect differential variation of the angle of incidence of the blades at different positions in the circular path of rotation.

11. Aircraft according to claim 1, comprising a horizontally disposed rotor mounted thereon in the path of the down current of the lifting screw to provide a Magnus effect producing a torque counter-acting the torque of the lifting screw.

12. Aircraft according to claim 1, having a driving motor for driving the airscrew through the rotatable ring of the ball bearing, and a free-wheel coupling between the said motor and the said ring.

BRUNO NAGLER.
RAOUL HAFNER.